(12) United States Patent
Baldwin et al.

(10) Patent No.: US 7,673,071 B2
(45) Date of Patent: Mar. 2, 2010

(54) APPARATUS, SYSTEM, AND METHOD FOR GENERATING A NAME FOR A SYSTEM OF DEVICES

(75) Inventors: Duane Mark Baldwin, Mantorville, MN (US); David Lynn Merbach, Rochester, MN (US); Sharad Mishra, Portland, OR (US)

(73) Assignee: International Business Machines Corporation, Armonk, NY (US)

(*) Notice: Subject to any disclaimer, the term of this patent is extended or adjusted under 35 U.S.C. 154(b) by 764 days.

(21) Appl. No.: 10/985,101

(22) Filed: Nov. 10, 2004

(65) Prior Publication Data

US 2006/0101211 A1    May 11, 2006

(51) Int. Cl.
G06F 15/16 (2006.01)
G06F 9/26 (2006.01)
G06F 9/34 (2006.01)

(52) U.S. Cl. .................. 709/245; 709/246; 711/200
(58) Field of Classification Search ............ 709/245, 709/213, 250; 711/200
See application file for complete search history.

(56) References Cited

U.S. PATENT DOCUMENTS

| | | | |
|---|---|---|---|
| 6,118,776 A * | 9/2000 | Berman | 370/351 |
| 6,256,740 B1 | 7/2001 | Muller et al. | 713/201 |
| 6,421,711 B1 * | 7/2002 | Blumenau et al. | 709/213 |
| 6,751,667 B1 * | 6/2004 | Helliwell | 709/226 |
| 6,877,042 B2 * | 4/2005 | Tawil et al. | 709/250 |
| 7,243,367 B2 * | 7/2007 | Kleinsteiber et al. | 726/3 |
| 7,249,181 B2 * | 7/2007 | Helliwell | 709/226 |
| 7,249,184 B1 * | 7/2007 | Barker | 709/227 |
| 2002/0087727 A1 | 7/2002 | Tawil et al. | 709/245 |
| 2002/0161933 A1 | 10/2002 | Shanthaveeraiah et al. | 709/328 |
| 2002/0194407 A1 | 12/2002 | Kim | 710/104 |
| 2003/0088658 A1 * | 5/2003 | Davies et al. | 709/223 |
| 2003/0149763 A1 | 8/2003 | Heitman et al. | 709/224 |
| 2005/0036499 A1 * | 2/2005 | Dutt et al. | 370/401 |

* cited by examiner

*Primary Examiner*—Vivek Srivastava
*Assistant Examiner*—Azizul Choudhury
(74) *Attorney, Agent, or Firm*—Kunzler & McKenzie

(57) ABSTRACT

An apparatus, system, and method are disclosed for generating a name for a system of devices. An identifier identifies each component in the system. Once each component is identified, information such as the World Wide Name (WWN) of each component is stored in a database. Additional information such as the IP address of each component may also be stored within the database. A comparator then compares a name such as the WWN of each component and selects the name of a selected component based on specified parameters provided by a user. The selected name is modified and then assigned as an identifier of the entire system of devices. The system of devices is thus assigned a unique identifier that remains the same each time those components form a system of devices.

17 Claims, 4 Drawing Sheets

APPARATUS, SYSTEM, AND METHOD FOR GENERATING A NAME FOR A SYSTEM OF DEVICES

BACKGROUND OF THE INVENTION

1. Field of the Invention

The invention relates to generating unique identifiers and more particularly relates to generating unique names for systems of devices, such as storage area networks, that do not automatically generate a name for the system of devices.

2. Description of the Related Art

Modern computer systems have driven a demand for enormous amounts of data storage. Data traditionally has been stored in one or more mass data storage devices, such as rotating magnetic disk drives or tape drives, attached to a single computer system. As computer systems have become larger, faster, and more reliable, there has been a corresponding increase in the need for storage capacity, speed, and reliability of the storage devices. Increases in the data storage capacity and reliability of storage devices have been dramatic in recent years. But despite the improvements to the devices themselves, there are certain limitations to what can be accomplished. Additional configurations of storage devices have increasingly been offered in recent years to meet demand for larger capacity, faster, more reliable, and more accessible data storage.

One example of alternative configurations is the rapidly increasing popularity of "RAID" systems, i.e., redundant arrays of independent disks. A RAID system stores data on multiple storage devices in a redundant fashion, such that the data can be recovered in the event of failure of any one of the storage devices in the redundant array. RAID systems are usually constructed with rotating magnetic hard disk drive storage devices, but may be constructed with other types of storage devices, such as optical disk drives, magnetic tape drives, floppy disk drives, etc.

Another example of a storage alternative is the concept of a storage subsystem. A storage subsystem implies a greater degree of independence from a host computer system than is typically found in an isolated storage device. For example, the subsystem may be packaged in a separate cabinet, with its own power supply, control software, diagnostics, etc. The subsystem may have a single storage device, but more typically contains multiple storage devices. The notion of a storage subsystem and a RAID system are not necessarily mutually exclusive; in fact, many RAID systems are constructed as semi-independent storage subsystems, which communicate with a host through a communication link having a defined protocol. It is possible in such subsystems that the host is not even aware of the existence of multiple data storage units or data redundancy in the storage subsystem. To the host, the subsystem may appear to be a single very large storage device.

Another example of a storage alternative is a Storage Area Network (SAN). SANs involve moving network storage from its traditional location—inside, or directly connected to, file servers—to a separate network of its own. Disk, tape, and optical storage can then be attached directly to this network, which is based on a fabric of fibre, switches and hubs that connects storage devices to a heterogeneous set of servers on a many-to-many basis.

A SAN is a dedicated storage network that carries I/O traffic only between servers and storage devices. A SAN can also enable direct storage-to-storage interconnectivity, and lends itself to the exploitation of new breeds of clustering technology and to getting the best out of network attached storage devices that can intelligently provide disk and tape capabilities to one or more servers. SANs provide continuous client availability to storage devices if a server in the loop fails, and some backup solutions are capable of replicating data and application files in real time to secondary servers on the SAN.

In order to manage SANs, each SAN must be associated with a unique identifier. This unique identifier allows a user to identify particular SANs within a local area network. Typically, the fabric of switches that comprise the SAN calculates the unique identifier internally. However, a problem arises when a fabric comprises switches that do not internally calculate a unique identifier. Without a unique identifier, a user is unable to properly identify and manage a particular SAN. Other systems of communication devices may experience similar difficulties.

From the foregoing discussion, it should be apparent that a need exists for an apparatus, system, and method that generate a unique name for SANs and other systems of communicating devices that do not automatically generate it. Beneficially, such an apparatus, system, and method would provide a unique identifier for a system based on the fabric of switches that comprise the system.

SUMMARY OF THE INVENTION

The present invention has been developed in response to the present state of the art, and in particular, in response to the problems and needs in the art that have not yet been fully solved by currently available name generation methods. Accordingly, the present invention has been developed to provide an apparatus, system, and method for generating a name for a system of devices that overcome many or all of the above-discussed shortcomings in the art.

The apparatus to generate a name for a system of devices is provided with a logic unit containing a plurality of modules configured to functionally execute the necessary steps of generating a unique identifier. These modules in the described embodiments include an identifier module configured to identify the name of each single device that comprises the system of devices. A compare module then compares the names of each device and selects a single device based on certain parameters of the name provided by a user. A modifier module then modifies the name of the selected single device and an assign module facilitates assigning the modified name as the name of the entire system of devices.

The apparatus, in one embodiment, is configured to identify the World Wide Name of each device comprising the system of devices. The apparatus is further configured, in one embodiment, to compare the World Wide Name of each device and select a particular device based on certain parameters inherit in the World Wide Name. The World Wide Name of the selected device is modified and then assigned as the name of the entire system of devices.

The apparatus is further configured, in one embodiment, to identify the IP address of each single device comprising the system of devices. Identifying the IP address of a single device facilitates identifying the IP address of each device that may be connected to the previously identified IP address.

In a further embodiment, the apparatus may be configured to store the IP address and World Wide Name of each identified device comprising the system of devices within a database. Storing the IP address of each device in a database facilitates the identifier module to identify each IP address without identifying duplicate IP addresses. Similarly, storing the World Wide Name of each device within a database facilitates the compare module to compare the name of each device and select a particular device based on predetermined parameters such that the selected World Wide Name may be modified and assigned as the name of the entire system of devices.

A system of the present invention is also presented to generate a name for a system of devices. The system may be embodied to generate a name for a storage area network. In particular, the system, in one embodiment, includes a switch component configured to connect to a plurality of switch components. The switch component and the connected plurality of switch components may comprise the system of devices.

An identifier facilitates identifying each switch component and any additional components that may be connected to a single switch component. A locator may be configured to locate the IP address of each switch component and any connected components comprising the system of devices.

The system may further include a comparator configured to compare the names of each switch component comprising the system of devices. The comparator may compare the World Wide Name (WWN) of each switch component. The WWN of each switch component may be stored within a database that facilitates the comparator to compare each WWN.

The system may also include a modifier configured to modify the name of at least one of the switch components comprising the system of devices. The modifier may modify the WWN of at least one of the switch components comprising the system of devices. The modifier may be configured to modify the lowest of the highest WWN depending on the parameters provided by a user.

An assignor may be configured to assign the modified name of the switch component to the system of devices. The assignor facilitates assigning a unique name for a system of devices that is unable to automatically generate a name.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
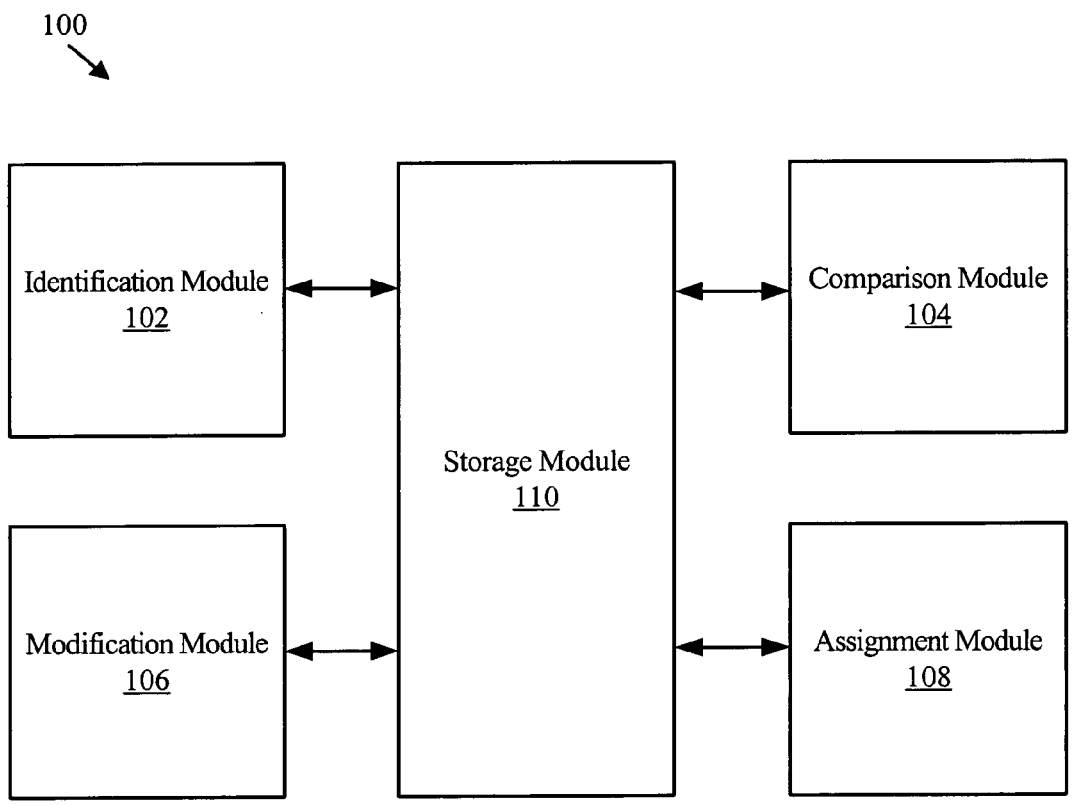
FIG. 1 is a schematic block diagram illustrating one embodiment of a name generating apparatus in accordance with the present invention.

FIG. 1 depicts a name generating apparatus 100 of the present invention. The name generating apparatus 100 may be implemented within a system of communicating device and is configured to provide a unique name to a user for the system of devices. The name generating apparatus 100 includes an identification module 102, a comparison module 104, a modification module 106, and an assignment module 108. As depicted, the identification module 102, the comparison module 104, the modification module 106, and the assignment module 108 communicate with a storage module 110 via a communications network 112. The depicted name generating apparatus 100 provides a unique name to a user for a system of devices.

The identification module 102 is configured to identify each device of a system of devices and provide information regarding each of the devices to the storage module 110. For example, the identification module 102 may identify the IP address of a single device. The identification module 102 may then provide the IP address of the single device to the storage module 110 via the communications network 112. The storage module 110 subsequently stores the IP address of this device. In one embodiment, the storage module 110 stores the IP address in an address list. The identification module 102 may then identify additional devices that are connected to the previously identified IP address. The storage module 110 may store the IP addresses of the additional devices.

The identification module 102 in one embodiment also identifies each device within the system of devices by identifying the World Wide Name (WWN) of each device. The WWN is a unique identifier associated with each single device comprising the whole system of devices. The storage module 110 in this embodiment stores the WWN of each device within the system of devices.

The comparison module 104 is configured to compare information about each device within the system of devices. The comparison module 104 is also configured, in one embodiment to select a particular device based on certain parameters specified by a user. For example, the comparison module 104 may compare the WWN of each device for which a WWN is stored in the storage module 110. The comparison module 104 may then select the WWN meeting a user-selected criterion. For instance, the comparison module 104 may select the WWN with the lowest binary value. Alternatively, the comparison module 104 may select the WWN with the highest binary value. The storage module 110 is configured to then store the selected WWN.

The modification module 106 is configured to modify information about the selected device within the system of the devices. For example, the modification module 106 may be configured to modify a name, such as the WWN of the selected device, and the storage module 110 may be configured to store the modified name.

The assignment module 108 is configured to assign the modified information to the entire system of devices. In one embodiment, the assignment module 108 assigns the modified WWN to the whole system of devices. This modified WWN may function as a unique name for the system of devices comprised of certain single devices.

Figure 2:
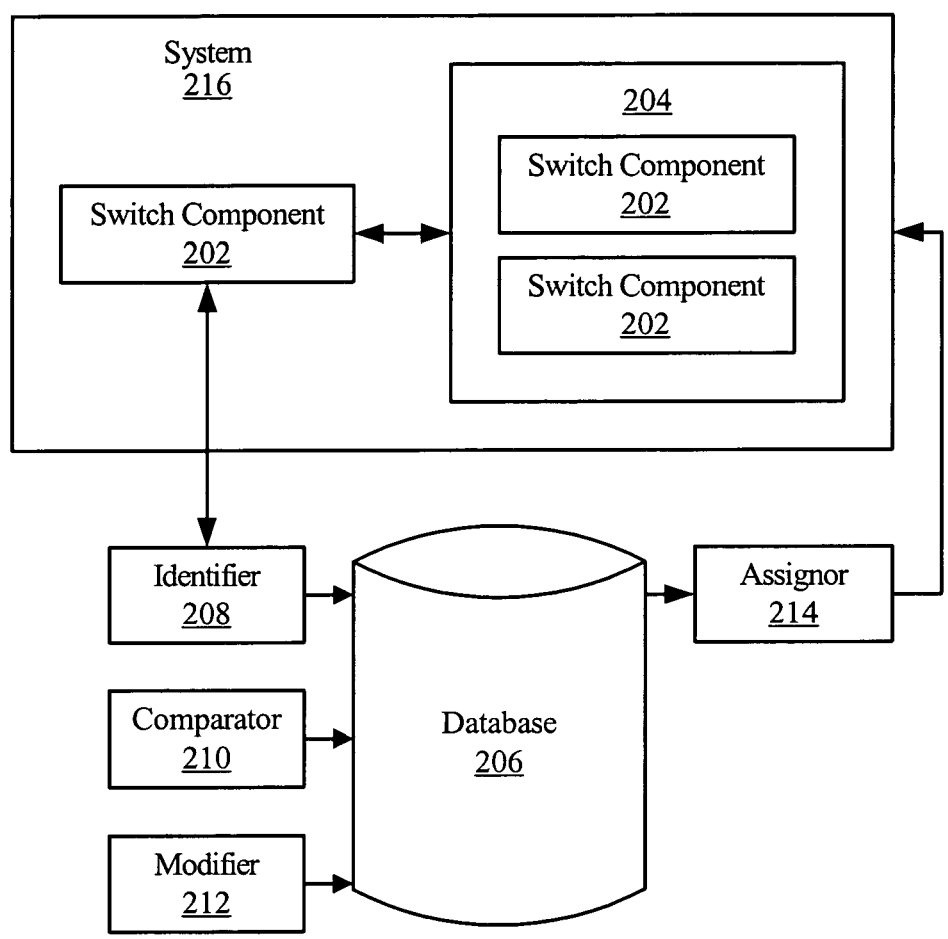
FIG. 2 is a schematic block diagram illustrating one embodiment of a name generating system in accordance with the present invention.

FIG. 2 depicts a name generating system 200 that generates a unique name for a system of devices. The name generating system 200 includes at least one single device such as a switch component 202. The switch component 202 may be a device that filters and forwards packets between local-area network segments. As depicted, the single switch component 202 may be connected to a plurality of other switch components 204. The single switch component 202 or the connection of the single switch component 202 together with the rest of the plurality of switch components 204 comprise a system of devices 216.

The system 200 further includes an identifier 208. As depicted, the identifier 208 may communicate with the switch components 202. The identifier 208 is configured to identify pertinent information regarding the switch components 202 and then store this information in a database 206. For example, the identifier 208 may identify the IP address of the switch components 202. The IP address of the switch components 202 may then be stored in the database 206. The identifier 208 is further configured to identify information, such as the IP address, of subsequent switch components 204 that may be connected to the single switch component 202. The IP address of each switch component comprising the plurality of switch components 204 is stored in the database 206.

The identifier 208 may also identify the unique identifier of the single switch component 202. The unique identifier may include the World Wide Name (WWN) of the single switch component 202. The identifier 208 further identifies the WWN of each switch component within the plurality of switch components 204. The database 206 stores the WWN of each switch component 202 within the plurality of switch components 204 that may be connected together.

After information regarding each switch component in the system of devices 216 is stored in the database 206, a comparator 210 compares the stored information of each switch component 202 and 204. For example, the comparator 210 may compare the WWN associated with the single switch component 202 and the WWN associated with each switch component comprising the plurality of switch components 204. The comparator 210 may then select a particular switch component based on a user-selected parameter regarding the WWN specified by a user. For example, the comparator 210 may select the switch component that is associated with the WWN that has the lowest binary value. Alternatively, the comparator 210 may select the switch component associated with the WWN that has the highest binary value.

After the comparator 210 selects a switch component based on the information stored in the database 206, a modifier 212 alters the information of the selected component. In one embodiment, the modifier 212 modifies the WWN of the switch component. For example, the modifier 212 may change the four least significant bits of the WWN of the switch component. The database 206 stores the altered WWN associated with the switch component. An assignor 214 retrieves the altered WWN from the database 206, and assigns the altered WWN as the name for the entire system of devices 216. The system of devices 216 is now uniquely identified by the altered WWN of the selected switch component within the system of devices 216.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbology employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
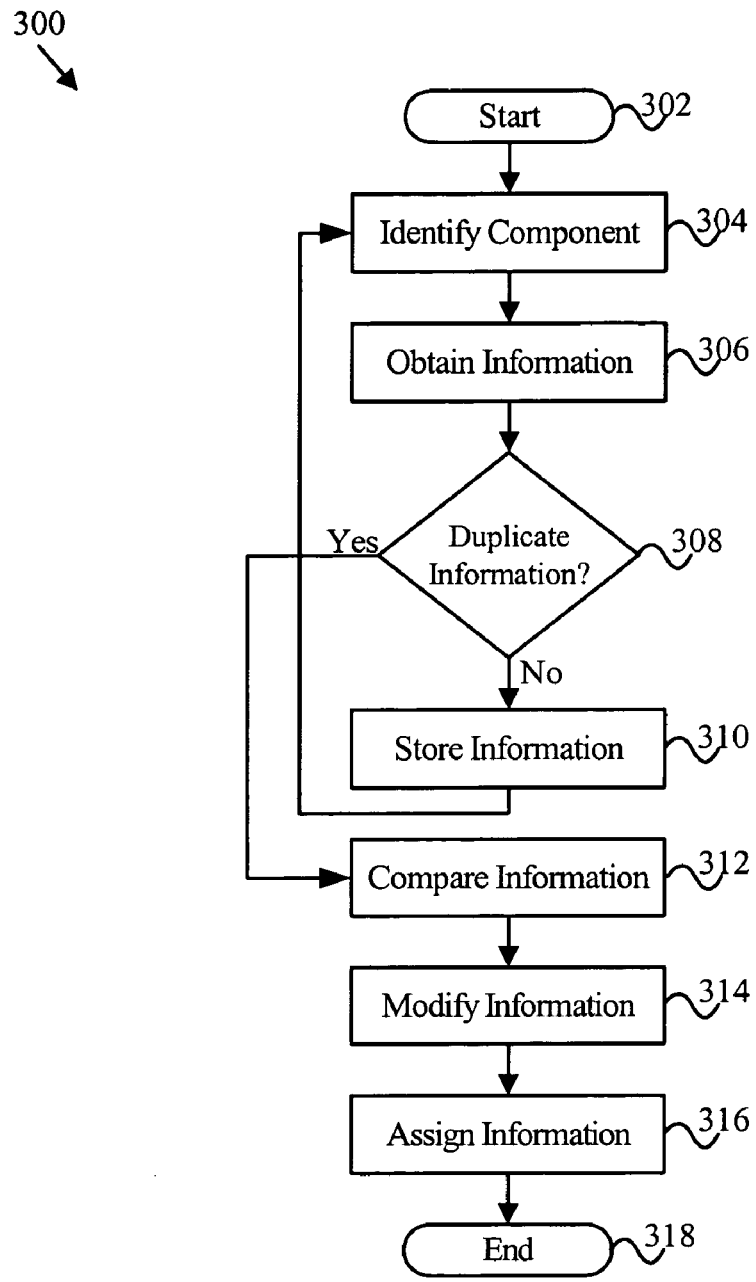
FIG. 3 is a schematic flow chart diagram illustrating one embodiment of a name generating method in accordance with the present invention.

FIG. 3 is a flow chart diagram illustrating one embodiment of a name generating method 300 of the present invention. The name generating method 300 provides a unique name for a system of devices for which a name is not automatically generated.

In the depicted embodiment, the method 300 starts 302 by identifying each component within the system of devices at an identify component step 304. In one embodiment, the identify component step 304 is conducted by the identification module 102 depicted in FIG. 1. The identified components may include switches within the system of devices.

Once a switch has been identified, the method 300 continues and acquires information regarding the switch at an obtain information step 306. The information gathered at the obtain step 306 may include the IP address of the switch and the World Wide Name (WWN) which is a unique identifier for the selected switch. The acquired information for the switch is then evaluated to determine if the information has been previously obtained at a duplicate inquiry step 308. If the information has already been acquired for that particular switch, the method 300 proceeds to compare the information gathered for all the switches comprising the system of devices at a compare information step 312. If the duplicate information inquiry 308 determines that the information has not been previously obtained, the information is stored at a store information step 310. In one embodiment, the information is stored in the storage module 110 as depicted in FIG. 1.

In a further embodiment, the information is stored in the database 206 depicted in FIG. 2. Once the information for the specified switch has been stored, the method 300 returns to identify any additional switches at the identify step 304. The method 300 continues until information for each switch comprising the system of devices has been identified and stored.

At the compare step 312, the information associated with each switch is evaluated. In one embodiment, the WWN of each switch is compared and one switch is selected according to a selected criterion. For instance, the switch that is associated with the WWN that has the lowest binary value may be selected. Alternatively, the switch that is associated with the WWN that has the highest binary value may be selected.

Once a switch has been selected at the compare step 312, the information associated with that switch is modified at a modify information step 314. In one embodiment, the WWN of the selected switch is modified. In a further embodiment, the Network Address Authority (NAA) portion of the WWN is modified. The NAA may comprise the last four binary values of the WWN. After the information has been modified at the modify information step 314, the method 300 proceeds to an assign information step 316.

The assign information step 316 facilitates assigning the modified information of the selected switch as the unique identifier of the entire system of devices. For example, the modified WWN of the selected switch is assigned to function as the name of the system of devices at the assign step 316 and the method 300 then ends 318.

Figure 4:
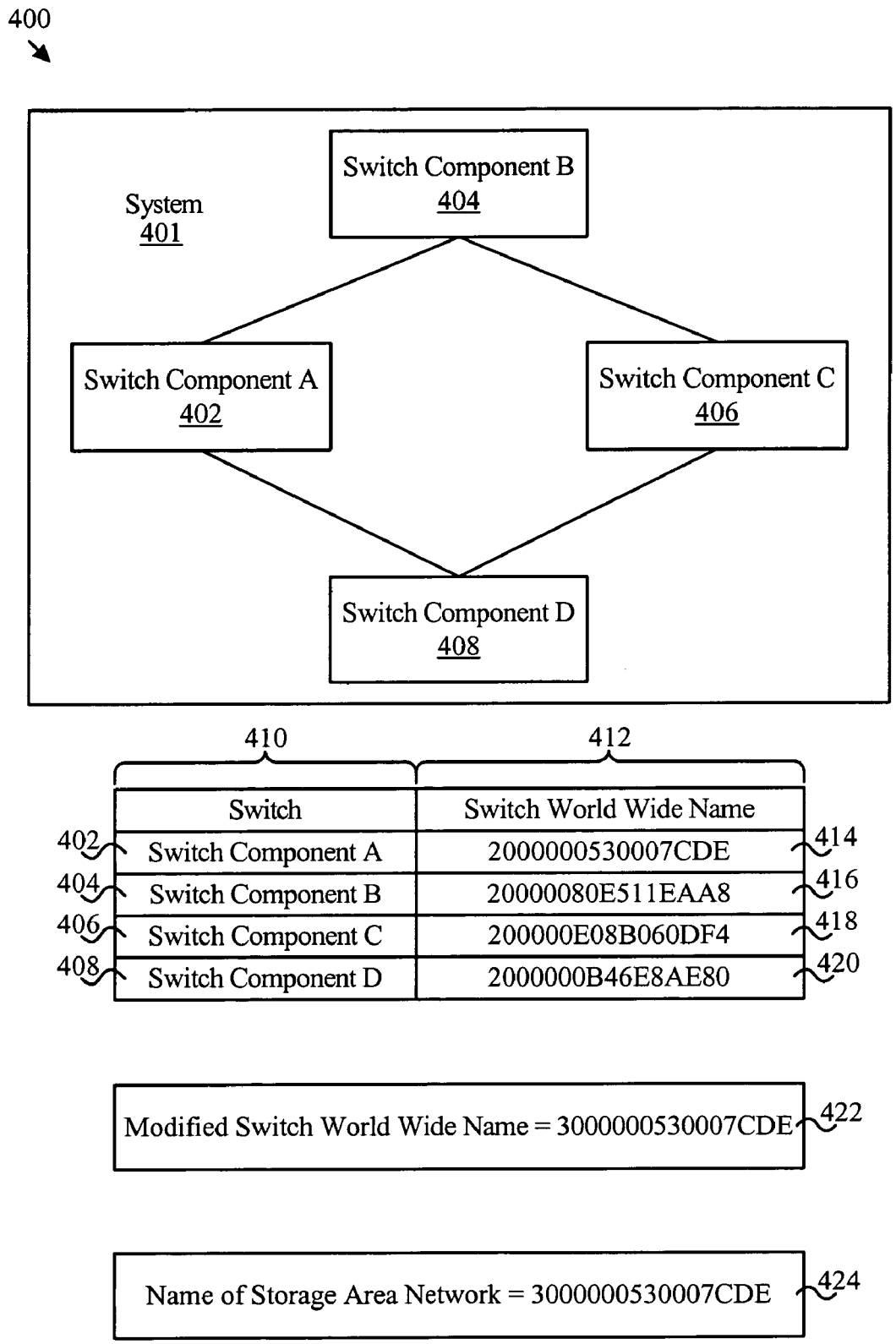
FIG. 4 is a conceptual block diagram illustrating one example of the operation of a name generating system in accordance with the present invention.

FIG. 4 illustrates an example of a name generating system 400 for a system of devices 401 in accordance with FIG. 2. The system 400 includes at least one device such as a switch component within the system of devices 401. The system 400 in the depicted example illustrates four switch components. Switch component A 402, switch component B 404, switch component C 406, and switch component D 408. The four switch components 402, 404, 406, and 408 facilitate filtering and receiving packets within the system of devices 401 such as a storage area network. The switch components may include commonly used switches in the technology such as the Cisco MDS 9000™, Brocade™, and Qlogic™.

Each of the switches in the system 400 is identified as described in the method 300 of FIG. 3. Information such as the name and World Wide Name (WWN) of each switch is obtained and stored in a database 206. The names may be stored in a switch name field section 410 of the database 206. The corresponding WWN of each switch may be stored in a switch WWN section 412 of the database. For example, the name of switch component A 402 may be stored in the switch name field section 410 with the corresponding WWN 414. Storing each switch name and corresponding WWN facilitates the WWN of each switch to be compared as described in the method 300.

In the depicted example, the WWNs of the switches are compared to determine which switch component has the lowest WWN. For example, the switch component A 402 may correspond with the lowest WWN 414. The WWN 414 of that component is then modified as described in the method 300. The modification of the WWN 414 may include changing the Network Address Authority (NAA) portion of the WWN 414. A modified WWN 422 is stored in the database 206. The modified WWN 422 is then assigned to be the name 424 of the system of devices 401. The system 400 facilitates assigning a unique name 424 to the system of devices 401. Each subsequent system of devices 401 that possesses the same switch components as described in FIG. 4, will be identified by the same unique name 424.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for automatically generating a name for a system of devices, the apparatus comprising:
    a storage device storing executable code;
    a processor executing the executable code, the executable code comprising
        an identification module identifying a World Wide Name of each of a plurality of devices within the system of devices, wherein no unique identifier was generated for the system;
        a comparison module comparing the World Wide Names of each of the plurality of devices within the system of devices and selecting a World Wide Name with the lowest binary value;
        a modification module modifying the selected World Wide Name by changing a least significant bit of a Network Address Authority (NAA) of the selected World Wide Name; and
        an assignment module assigning the modified World Wide Name as a unique identifier of the system of devices, wherein the unique identifier is the name of the system of devices.

2. The apparatus of claim 1, the identification module further identifying the World Wide Name of additional devices connected to the World Wide Name of the single device.

3. The apparatus of claim 1, the executable code further comprising a storage module storing the World Wide Name of each device within the plurality of devices.

4. The apparatus of claim 1, the comparison module further comparing the World Wide Name of each device within the plurality of devices.

5. The apparatus of claim 1, wherein the identification module identifies World Wide Names of the plurality of devices until identifying a duplicate World Wide Name.

6. The apparatus of claim 5, wherein the devices comprise switches.

7. The apparatus of 6, wherein the system of devices is a Storage Area Network.

8. A system of devices capable of generating a name for the system of devices, comprising:
- a switch component to connecting to a plurality of switch components within the system of devices, wherein no unique identifier was generated for the system;
- a storage device storing executable code;
- a processor executing the executable code, the executable code comprising
  - a comparator comparing World Wide Names of each switch component within the system of devices and selecting a World Wide Name with the lowest binary value;
  - a modifier modifying the selected World Wide Name by changing a least significant bit of a NAA of the selected World Wide Name; and
  - an assignor assigning the modified World Wide Name of the switch component as a unique identifier of the system of devices, wherein the unique identifier is the name of the system of devices.

9. The system of claim 8, the executable code further comprising a database storing the World Wide Names of each switch component within the system of devices.

10. The system of claim 8, the executable code further comprising an identifier identifying the switch component and the connected plurality of switch components.

11. The system of claim 8, the executable code further comprising a locator locating the World Wide Name of the switch component and the World Wide Names of the connected plurality of switch components.

12. The system of claim 8, wherein the comparator compares World Wide Names of the plurality of switch components until identifying a duplicate World Wide Name.

13. The system of 12, wherein the system of devices is a Storage Area Network.

14. A computer readable storage medium storing a computer readable program code for generating a name for a system of devices, the program code executed by a processor to perform operations comprising:
- comparing World Wide Names of components within the system of devices, wherein no unique identifier was generated for the system of devices;
- selecting a World Wide Name with the lowest binary value;
- modifying the selected World Wide Name by changing a least significant bit of a NAA of the selected World Wide Name;
- assigning the modified World Wide Name as a unique identifier of the system of devices, wherein the unique identifier is the name of the system of devices.

15. The computer readable storage medium of claim 14, the operations further comprising comparing World Wide Names of the components until identifying a duplicate World Wide Name.

16. The computer readable storage medium of claim 15, wherein the components are switches.

17. The computer readable storage medium of 16, wherein the system of devices is a Storage Area Network.

* * * * *